US011516346B2

(12) United States Patent
Sima (10) Patent No.: US 11,516,346 B2
(45) Date of Patent: Nov. 29, 2022

(54) THREE-WAY CALLING TERMINAL FOR MOBILE HUMAN-MACHINE COORDINATION CALLING ROBOT (71) Applicant: NANJING SILICON INTELLIGENCE TECHNOLOGY CO., LTD., Nanjing (CN)

(72) Inventor: Huapeng Sima, Nanjing (CN)

(73) Assignee: NANJING SILICON INTELLIGENCE TECHNOLOGY CO., LTD., Nanjing (CN)

(*) Notice: Subject to any disclaimer, the term of this patent is extended or adjusted under 35 U.S.C. 154(b) by 0 days.

(21) Appl. No.: 17/612,673

(22) PCT Filed: Jul. 8, 2021

(86) PCT No.: PCT/CN2021/105295
§ 371 (c)(1),
(2) Date: Nov. 19, 2021

(87) PCT Pub. No.: WO2022/012413
PCT Pub. Date: Apr. 20, 2022

(65) Prior Publication Data
US 2022/0210275 A1 Jun. 30, 2022

(30) Foreign Application Priority Data
Jul. 13, 2020 (CN) .......................... 202010669451.X (51) Int. Cl.
H04M 3/527 (2006.01)
G10L 13/02 (2013.01)
(Continued)

(52) U.S. Cl.
CPC ............. H04M 3/527 (2013.01); G10L 13/02 (2013.01); G10L 15/1815 (2013.01);
(Continued)

(58) Field of Classification Search
None
See application file for complete search history.

(56) References Cited

U.S. PATENT DOCUMENTS 5,855,003 A * 12/1998 Ladden ............... H04W 88/181
704/270
6,690,776 B1 * 2/2004 Raasch .................. H04M 11/06
379/215.01
(Continued)

FOREIGN PATENT DOCUMENTS

CN 108965620 A 12/2018
CN 110035187 A 7/2019
(Continued)

OTHER PUBLICATIONS

First office action issued by the China National Intellectual Property Administration for Application 202010669451.X dated Feb. 10, 2021.
(Continued)

Primary Examiner — Jakieda R Jackson
(74) Attorney, Agent, or Firm — Reising Ethington, P.C.

(57) ABSTRACT

A three-way calling terminal for a mobile human-machine coordination calling robot. Technical solutions include: a first speech interface, configured to transfer call audio between a call object and a back-end processing module; a CODEC1 module, configured to encode and decode the call audio between the call object and the back-end processing module; a second speech interface, configured to transfer call audio between the human agent and the call object; a CODEC2 module, configured to encode and decode the call audio between the human agent and the call object; a call control module, configured to process a control signal, and automatically make, answer, and hang up a call; a data processing submodule, configured to process speech data and perform data transfer between the data processing
(Continued)

submodule and the back-end processing module; and a networking submodule, configured to be connected to the back-end processing module.

5 Claims, 2 Drawing Sheets

(51) Int. Cl.
   *G10L 15/18* (2013.01)
   *G10L 15/22* (2006.01)
   *G10L 19/16* (2013.01)
   *H04M 3/56* (2006.01)
(52) U.S. Cl.
   CPC .............. *G10L 15/22* (2013.01); *G10L 19/16* (2013.01); *H04M 3/56* (2013.01)

(56) References Cited

U.S. PATENT DOCUMENTS

| | | | | |
|---|---|---|---|---|
| 6,690,933 | B1* | 2/2004 | Chapman, Jr. | H04W 4/24 455/414.1 |
| 6,704,567 | B1* | 3/2004 | Chapman, Jr. | H04W 4/24 455/552.1 |
| 7,185,054 | B1* | 2/2007 | Ludwig | H04L 65/1101 348/E7.083 |
| 9,930,088 | B1* | 3/2018 | Hodge | H04L 65/4015 |
| 2002/0176404 | A1* | 11/2002 | Girard | H04M 3/42153 379/207.02 |
| 2004/0029564 | A1* | 2/2004 | Hodge | H04M 3/385 455/563 |
| 2014/0236591 | A1* | 8/2014 | Yue | G10L 15/083 704/230 |
| 2015/0117236 | A1* | 4/2015 | Dunne | H04L 65/1083 370/252 |
| 2017/0163434 | A1* | 6/2017 | Bathurst | H04L 9/40 |
| 2018/0020093 | A1 | 1/2018 | Bentitou et al. | |
| 2018/0376004 | A1* | 12/2018 | Kodali | H04W 24/08 |
| 2019/0371331 | A1* | 12/2019 | Schramm | H04M 3/42263 |
| 2020/0267259 | A1* | 8/2020 | Behm | H04M 1/72475 |
| 2021/0125608 | A1* | 4/2021 | Weir | G10L 15/22 |

FOREIGN PATENT DOCUMENTS

| | | |
|---|---|---|
| CN | 110166643 A | 8/2019 |
| CN | 111787169 A | 10/2020 |

OTHER PUBLICATIONS

International Search Report and Written Opinion issued to for PCT/CN2021/105295.

* cited by examiner

THREE-WAY CALLING TERMINAL FOR MOBILE HUMAN-MACHINE COORDINATION CALLING ROBOT

This disclosure claims the priority to the Chinese Application No. 202010669451.X, filed with the China National Intellectual Property Administration on Jul. 13, 2020 and entitled "THREE-WAY CALLING TERMINAL FOR MOBILE HUMAN-MACHINE COORDINATION CALLING ROBOT", which is incorporated herein by reference in its entirety.

FIELD

The present disclosure relates to the field of artificial intelligence, and in particular, to a three-way calling terminal for a mobile human-machine coordination calling robot.

BACKGROUND

With rapid progress of a machine technology, a communications technology, an Internet and an artificial intelligence technology, various smart home appliances, such as smart televisions, smart refrigerators, smart air conditioners, smart speakers, smart watches, smart bracelets, and smart glasses, constantly enter lives of people. At present, a large number of smart devices of various brands based on speech interaction have been put on the market. A user can interact with the smart device by transmitting a speech instruction, to realize functions of song listening, time reporting, chatting, games, companionship, information query, device control, and the like. However, at present the smart devices are mainly applied to the fields such as family life, leisure and entertainment, children education, or the like, and are rare and difficult to be applied to enterprise-level applications.

As the artificial intelligence technology and the communications technology flourish, telephone robots have been widely applied in all industries, with labor costs of a call center being greatly reduced and efficiency being improved. However, prior speech interactive robots, especially telephone human-machine coordination calling robot systems, include a human-machine coordination calling robot system that is primarily based on the artificial intelligence technology and dialogue system, and a speech communication system that is primarily based on communication networks and the VOIP technology, both of which are tightly bound to each other so that a system is extremely complex, and is more difficult to be developed, deployed, and maintained, having high costs. Moreover, it is very difficult and inflexible to replace any components therein. A telephone robot developed on this basis is too complex and large, and is difficult to be moved once deployed. Such a telephone robot is based on a large-scale cloud server, and has no entity that can be easily cognized by ordinary people, which cannot give people an intuitive and friendly impression.

To implement a mobile human-machine coordination calling robot, there is a need of a three-way calling terminal that supports three-party calling and is convenient and easy to use. A conventional human-machine coordination calling robot generally uses a desktop machine as a calling terminal, which is complex in operation and is inconvenient for moving; while a novel mobile telephone three-way calling terminal does not support three-way calling, and cannot implement a human-machine coordination calling robot.

SUMMARY

An objective of the present disclosure to provide a three-way calling terminal for a mobile human-machine coordination calling robot, where the three-way calling terminal can be decoupled from a communications system, and therefore is easy for deployment and is convenient for switching, having movability, so that the three-way calling terminal can be conveniently placed in various places; and the three-way calling terminal is conveniently connected to a personal mobile phone or calling terminal.

The foregoing technical objective of the present disclosure is achieved through the following technical solutions.

According to a first aspect, the present disclosure provides a three-way calling terminal for a mobile human-machine coordination calling robot, including:

a first speech interface, configured to be connected to a back-end processing module, and transfer call audio between a call object and the back-end processing module, where the back-end processing module is configured to interact with the call object according to a preset rule;

a CODEC1 module, configured to encode and/or decode the call audio between the call object and the back-end processing module;

a second speech interface, configured to be connected to a human agent, and transfer call audio between the call object and the human agent, where the second speech interface is further configured to transfer the call audio between the call object and the back-end processing module to the human agent;

a CODEC2 module, configured to encode and/or decode the call audio between the call object and the human agent;

a call control module, configured to process a control signal, and automatically make, answer, and hang up a call;

a data processing submodule, configured to process speech data and perform data transfer between the data processing submodule and the back-end processing module; and a networking submodule, configured to perform network connection to the back-end processing module.

In a preferable technical solution of the present disclosure, the three-way calling terminal further includes a display module, and the display module is configured to display, to the human agent and the call object, a call record or call-related information between the call object and the back-end processing module.

In a preferable technical solution of the present disclosure, the three-way calling terminal further includes a keypad submodule, through which a control instruction is inputted.

In a preferable technical solution of the present disclosure, the three-way calling terminal is disposed within an audio device, the audio device includes a speaker and a microphone, and the second speech interface of the three-way calling terminal is connected to the speaker and the microphone of the audio device.

According to a second aspect, the present disclosure further provides a communications system, where the communications system includes the three-way calling terminal according to the first aspect, the back-end processing module, and the human agent, and at least one communications terminal, wherein the human agent is connected to the three-way calling terminal through the communications terminal.

In a preferable technical solution of the present disclosure, the back-end processing module is configured to process speech data transmitted by the three-way calling terminal, and generate response speech and text to be transmitted back to the three-way calling terminal.

In a preferable technical solution of the present disclosure, the back-end processing module includes a dialogue management submodule, a speech recognition submodule, an intention recognition submodule, and a speech synthesis submodule;

the dialogue management submodule is configured to control procedure and logic of a dialogue, and generate response text;

the speech recognition submodule is configured to recognize received speech of the call object, and convert the speech into text;

the intention recognition submodule is configured to recognize an intention of the call object based on the text of the recognized speech; and the speech synthesis submodule is configured to synthesize and transmit the speech from the response text to the three-way calling terminal.

According to a third aspect, the present disclosure further provides a calling method, applicable to the calling system according to the second aspect, where the method includes:

obtaining speech of a call object by a communications terminal, and transferring, by a three-way calling terminal, the speech of the call object to a back-end processing module and a human agent;

transferring response speech to the communications terminal by the three-way calling terminal, so as to transfer the response speech to the call object by the communications terminal; and transferring the response speech and/or response text to the human agent by the three-way calling terminal, wherein the response speech and the response text are generated by the back-end processing module based on the speech of the call object according to a preset rule.

In a preferable technical solution of the present disclosure, before the obtaining speech of a call object by a communications terminal, the method further includes:

synchronizing, by the three-way calling terminal, scripts written according to service logic and data of the call object to the back-end processing module;

starting a session between the communications terminal and the back-end processing module after the back-end processing module receives the scripts and the data of the call object;

transmitting an instruction to the three-way calling terminal by the back-end processing module, so that the three-way calling terminal enters an answer mode; and transmitting, by the back-end processing module, speech and text of a prologue/salutatory to a calling terminal through the three-way calling terminal, so as to start calling between the back-end processing module and the call object.

In a preferable technical solution of the present disclosure, before the synchronizing, by the three-way calling terminal, scripts written according to service logic and data of the call object to the back-end processing module, the method further includes:

loading a task list by the three-way calling terminal based on an operation of a manager or a pre-scheduled task;

retrieving, by the three-way calling terminal, a corresponding one of the scripts according to the task list, where each of the scripts represents a complete set of service processes; and querying, by the three-way calling terminal, the data of the call object from a call object database.

In a preferable technical solution of the present disclosure, generating robot response speech and text after processing the speech of the call object by the back-end processing module includes:

analyzing, by the back-end processing module, an intention of the call object based on the speech of the call object;

generating, by the back-end processing module, response sentence text based on the intention of the call object and a strategy and a rule set in the script; and determining, by the back-end processing module, the robot response speech based on the response sentence text.

In a preferable technical solution of the present disclosure, the analyzing, by the back-end processing module, an intention of the call object based on the speech of the call object includes:

converting the speech of the call object into text by the back-end processing module;

performing word division on the text by the back-end processing module, to obtain a division result;

analyzing, by the back-end processing module, the intention of the call object based on the division result.

In a preferable technical solution of the present disclosure, the method further includes:

displaying a call record or call-related information between the back-end processing module and the call object by the three-way calling terminal.

In a preferable technical solution of the present disclosure, the method further includes:

if it is recognized that a dialogue between the communications terminal and the back-end processing module ends, ending the session between the communications terminal and the back-end processing module by the back-end processing module; and transferring, by the back-end processing module, a call record to the three-way calling terminal, and saving the call record in a database of the three-way calling terminal.

In a preferable technical solution of the present disclosure, the method further includes:

transmitting, by the human agent, a human intervention instruction to the three-way calling terminal; and cutting off a connection to the back-end processing module by the three-way calling terminal in response to the human intervention instruction, and transferring into a human intervention mode.

In view of the above, in the present disclosure, a communications system (the human agent and the communications terminal) is decoupled from the human-machine coordination calling robot system (the back-end processing module) by the three-way calling terminal. In this way, system complexity is reduced, so that the system is easy for deployment, and is convenient for flexible switching, thereby significantly reducing costs of a telephone human-machine coordination calling robot system for development, deployment, and maintenance. Moreover, movability is provided for the robot, so that the three-way calling terminal can be conveniently placed in various places. An intuitive and touchable entity may also be provided for the robot, to make the robot friendlier. The three-way calling terminal is conveniently connected to a personal mobile phone or calling terminal. Accessing manners such as a Bluetooth port and an audio port are provided, so that the three-way calling terminal is widely applied.

DETAILED DESCRIPTION OF THE EMBODIMENTS

The three-way calling system is further described in detail below with reference to the accompanying drawings.

Figure 2:
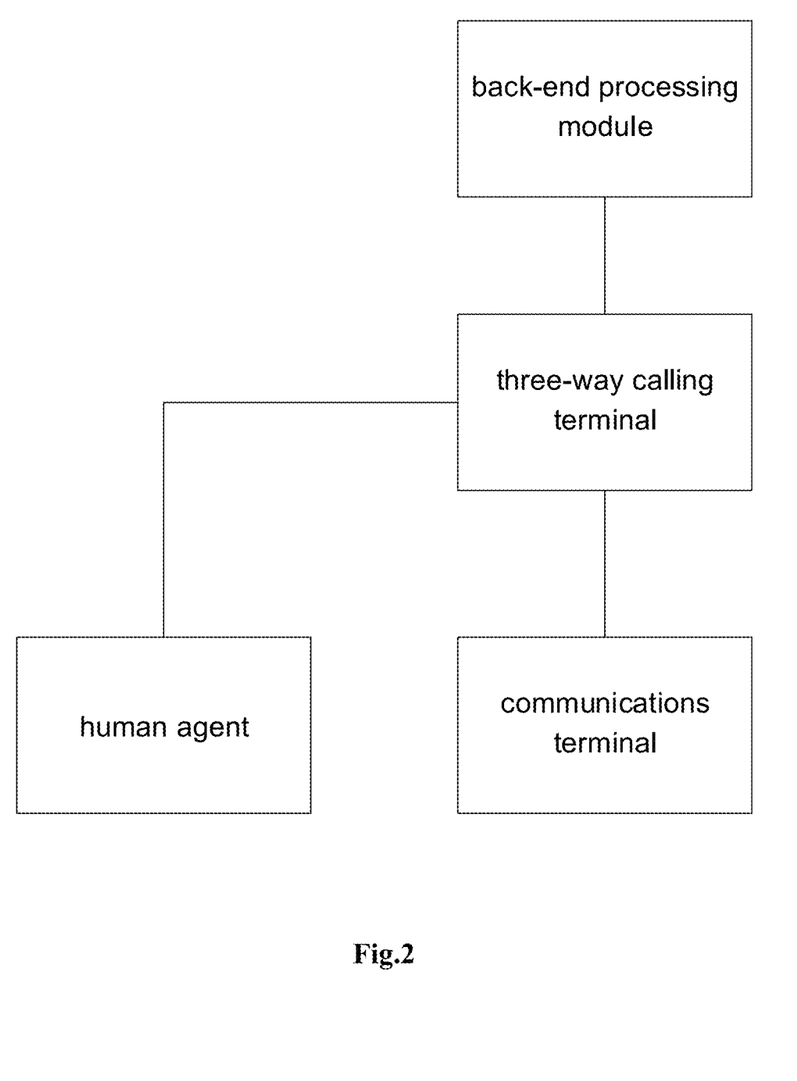
FIG. 2 is a schematic structural diagram of a three-way calling system according to the present disclosure.

As shown in FIG. 2, the present disclosure provides a three-way calling system, including: a three-way calling terminal, a back-end processing module, a human agent, and at least one communications terminal. As shown in FIG. 2, the three-way calling system includes one communications terminal. During use, the back-end processing module, the human agent, and the communications terminal may be respectively connected to the three-way calling system, so that speech data is transferred among the back-end processing module, the human agent, and the communications terminal through the three-way calling system. The communications terminal is a terminal device used by a call object. The human agent is a terminal device that monitors a dialogue between the back-end processing module and the communications terminal, is configured to monitor the speech data between the back-end processing module and the communications terminal, and may dialogue directly with the communications terminal by human intervention in place of the back-end processing module.

Figure 1:
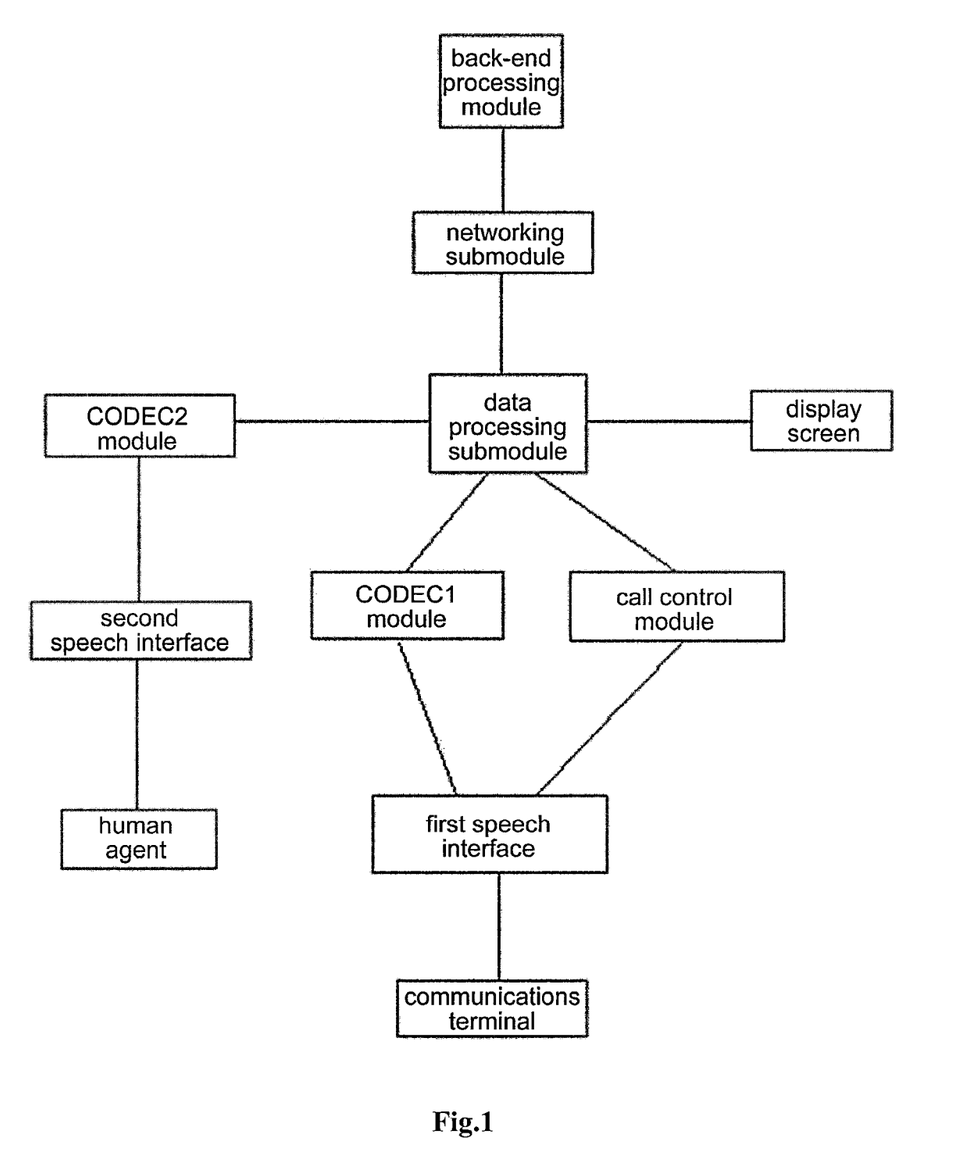
FIG. 1 is a block diagram of modules of a three-way calling terminal according to the present disclosure.

In the present disclosure, a three-way calling terminal shown in FIG. 1 may be used. The three-way calling terminal includes a first speech interface, a CODEC1 module, a second speech interface, a CODEC2 module, a call control module, a data processing submodule, and a networking submodule. The three-way calling terminal is configured to transfer the speech data among the back-end processing module, the human agent, and the communications terminal.

Operation processes of the three-way calling terminal, the back-end processing module, and the communications terminal are specifically introduced below.

The operation process of the communications terminal includes:

M1. Connecting the three-way calling terminal;

M2. After a session is started, receiving call audio from a call object;

M3. Inputting the call audio to the three-way calling terminal through a second speech interface, to transfer the call audio to the back-end processing module and the human agent by the three-way calling terminal; and M4. Receiving, through the second speech interface, robot response speech or speech of the human agent that is transferred by the three-way calling terminal.

Modules in the three-way calling terminal are introduced as below.

The first speech interface is configured to transfer call audio between the call object and the back-end processing module.

The CODEC1 module is configured to encode and decode the call audio between the call object and the back-end processing module.

The second speech interface is configured to transfer call audio between the human agent and the call object.

The CODEC2 module is configured to encode and decode the call audio between the human agent and the call object.

The first speech interface and the second speech interface may be Bluetooth ports or audio ports. During a call, the human agent may receive the call audio through the second speech interface, to determine whether to perform human intervention. When human intervention is required, the speech of the human agent is transmitted to the three-way calling terminal also through the second speech interface.

One or more common microphones or MEMS microphones may be disposed at the audio port. A far-field microphone array may also be used to receive speech of the call object that is transmitted by the communications terminal through a speech connection module. A sound play device such as a speaker or the like may be further provided, to play the robot response speech. If desired, the speech of the call object may also be played through the speaker, only in the case of resulting in no reverberation, howling, and reverberation.

The networking submodule is configured to be connected to the back-end processing module through a line link, WIFI, or a 4G/5G network, to transmit/receive speech and other data.

The data processing submodule is configured to schedule and control other modules in the three-way calling terminal, to process and transmit the speech data to the back-end processing module, to process and transmit the speech data from the back-end processing module to the communications terminal, to control a display screen to display a text record of the call, and to receive a user instruction from a touch screen.

The call control module is configured to control a communications system to make batch calls with the three-way calling terminal.

The call control module includes a call object database, a system database, a task management module, and a communication controller submodule.

The call object database is configured to store data related to the call object.

The system database is configured to store a call record and other data related to a call process.

The task management module is configured to manage a call task.

The communication controller submodule is configured to schedule other modules to obtain or store data, and control the communications system to make batch calls.

In addition, the call control module further includes a script editor and a script database. The script editor is used for a script producer to produce and modify a script. The script database is configured to store the script that is produced by the script producer by using the script editor.

A workflow of the call control module is described as follows:

according to an operation of a manager or a pre-scheduled task, loading a task list through the task management module;

retrieving, from the script database, a script that is required by a task and is produced by the script producer in advance, where a script represents a complete set of service processes, including dialogue rules, all possible response sentence text, rules for evaluating an intention of the call object, and other dialogue and service-related data; and if sound recording is performed by a sound engineer, recorded audio may be further included;

querying required data from the call object database, for example, a phone number, a name, gender, and other service-related data such as an amount in arrear, and the like;

synchronizing the script and data about the call object to the back-end processing module through network;

controlling the communications terminal to connect (by means of actively dialing or passively answering) the call object; and after the call ends, receiving a call record from the back-end processing module to be stored to a database.

According to requirements, the foregoing processes may be performed in batches; or may be concurrently performed, provided that there are a plurality of communications terminals and three-way calling terminals, and the back-end processing module supports concurrent tasks.

In addition, the three-way calling terminal further includes a display screen and a keypad submodule. The display screen may display a call record or other call-related information about a human-machine coordination calling robot system and the call object. A touch screen may also be used with implementing a button function at the same time, to allow a user to input a control instruction through touching.

The three-way calling terminal may be further provided with a wireless communications system such as Bluetooth, to communicate with the speech connection module.

The three-way calling terminal may be further provided with an audio circuit, so that audio can be directly input and output in a form of digits.

The three-way calling terminal may be further provided with a power amplification module, to amplify a sound signal from the speech connection module.

The three-way calling terminal may be further provided with a speech denoising module, to perform a denoising process of a received audio signal.

The three-way calling terminal may be further provided with an AD/DA conversion chip, to convert received speech of the call object into a digital signal for transmission, and convert received robot speech into an analog signal to be played through the speaker.

The three-way calling terminal may be further provided with a control interface, including buttons, knobs, and the like, for external control.

The operation process of the three-way calling terminal includes:

A1. Connecting the three-way calling terminal to the communications terminal;

A2. Connecting the three-way calling terminal to the back-end processing module;

A3. Starting a session and connecting the call object;

A4. Transferring the speech of the call object to the back-end processing module through the communications terminal and the three-way calling terminal;

A5. Generating robot response speech and text by the back-end processing module after the speech of the call object is processed;

A6. Transferring the robot response speech to the call object through the three-way calling terminal and the communications terminal;

A7. Transferring the robot response text to the three-way calling terminal to be displayed; and A8. Tracking, by the human agent, a call process at any time through the three-way calling terminal, where human answering may be transferred to when necessary, to implement a human-machine coordination calling function.

The back-end processing module is configured to perform intention recognition on the speech data transmitted by the three-way calling terminal, and generate replay speech based on a speech intention to be transmitted to the three-way calling terminal. The back-end processing module includes a dialogue management submodule, a speech recognition submodule, an intention recognition submodule, a speech synthesis submodule, a word division submodule, a voice separation submodule, voiceprint recognition, and a session management submodule. The back-end processing module is deployed on a cloud server, and communicates with the three-way calling terminal through a wired or wireless network.

The dialogue management submodule is configured to control procedure and logic of a dialogue, and generate response text.

The speech recognition submodule is configured to recognize received speech of the call object, and convert the speech into text.

The intention recognition submodule is configured to recognize an intention of the call object based on the recognized speech text.

The speech synthesis submodule is configured to synthesize speech from the response text and transmit the speech to the three-way calling terminal.

An operation process of a session system of the back-end processing module is described as follows:

S1. After the call control module connect (by means of actively dialing or passively answering) a call from the call object through the communications terminal, synchronizing scripts written according to service logic and data of the call object to the session management submodule and the dialogue management submodule of the back-end processing module;

S2. The session management submodule starts a new session;

S3. The session management submodule transmits an instruction to the three-way calling terminal, so that the three-way calling terminal enters an answering mode;

S4. The session management submodule transmits speech and text of a prologue/salutatory to the three-way calling terminal;

S5. The three-way calling terminal transmits the speech to the call object through the speech connection module and the communications system, to start a call between the robot and the call object;

S6. The three-way calling terminal receives the speech of the call object, and transmits the speech to the speech recognition submodule of the back-end processing module through a network;

S7. The speech recognition submodule converts the speech of the call object into text, and transmits the text to the intention recognition submodule;

S8. The intention recognition submodule invokes the word division submodule to perform firstly word division, recognizes an intention of the call object based on a division result in conjunction with the script, and transmits the intention to the dialogue management submodule;

S9. Optionally, the intention may also be recognized directly from the speech of the call object by the intention recognition submodule;

S10. The dialogue management submodule generates response sentence text based on a strategy and a rule set in the script, and transmits the response sentence text to the speech synthesis submodule;

S11. The speech synthesis submodule converts the text into robot response speech; and optionally, the robot response speech may be recorded by a recording engineer in advance, and may be retrieved according to an answer sentence;

S12. Transmitting the response sentence text and the speech to the three-way calling terminal for playing, and transmitting the same to the call object through the speech connection module and the communications system;

S13. Repeating the foregoing steps, until the dialogue ends; and

S14. The session management submodule ends the session, transfers the call record to the call control module, and stores the call record into the system database, for query and analysis in later.

In the present disclosure, the communications system is decoupled from the human-machine coordination calling robot system, with system complexity reduced, so that the system is easy for deployment, and is convenient for flexible switching, thereby significantly reducing costs of a telephone human-machine coordination calling robot system for development, deployment, and maintenance. Moreover, movability is provided for the robot, where the three-way calling terminal can be conveniently put in various places. An intuitive and touchable entity may also be provided for the robot, to make the robot friendlier. The three-way calling terminal is conveniently connected to a personal mobile phone or calling terminal. Accessing manners such as a Bluetooth port and an audio port are provided, so that the three-way calling terminal is widely applied.

Meanwhile, the three-way calling terminal in the present disclosure keeps functions of a conventional telephone client service human-machine coordination calling robot system: providing screen display; being able to be easily set; accessing a call record and switching; being more convenient for use; supporting external devices such as Headphones; and tracking calls at any time, to facilitate a human agent to intervenes.

Specifically, for a telephone robot in the prior art, a communication system, a human-machine coordination calling system, and a background calling robot system thereof are all bound to one another. Therefore, the telephone robot still adopts a deployment method similar to that of a call center, that is, a corresponding telephone robot system is deployed in advance in a place where the telephone robot system is going to be used, and a human agent or other users need to work in the place deployed with the system, so as to realize a function of human-machine coordination calling. Compared with the foregoing prior art, the deployment method of the three-way calling terminal in the present disclosure is more convenient.

In an implementation, the three-way calling terminal applies the communications system in the prior art to a communications terminal of a user, such as a mobile phone or a fixed-line telephone, so as to unbind the communication system from the human-machine coordination calling system and the background calling robot system. A deployment method of the three-way calling terminal in this implementation is illustrated below through an example.

In an example, an independent salesperson, as a user of the three-way calling terminal, directly connects the three-way calling terminal to a calling terminal (such as a mobile phone) thereof in a wired or wireless manner, to complete deployment, without any other operations. Therefore, the three-way calling terminal in this implementation is significantly improved in deployment efficiency and conveniency as compared with that in the prior art.

In actual use, on one hand, the salesperson in the foregoing example can connect the three-way calling terminal to a mobile phone thereof by means of an audio cable or Bluetooth connection; and on the other hand, the three-way calling terminal further provides audio data for the salesperson through a headset connected to the three-way calling terminal (for example, a three-way calling terminal carrying a speaker/microphone may also directly play the audio data). After the salesperson makes a call to an intending client by a mobile phone (or may automatically make a call to an intending client by the three-way calling terminal), the three-way calling terminal uploads speech input by the intending client to the back-end processing module provided in the cloud. After a telephone robot in the back-end processing module generates a corresponding response according to a rule, the three-way calling terminal further returns a response speech to the intending client, so as to implement an interaction between the back-end processing module and the intending client. In the foregoing process, the salesperson can monitor an interaction process between the back-end processing module and the intending client at any time through the headset, and interact directly with the intending client through the three-way calling terminal when human intervention is required.

It may be learned from the foregoing uses that for the three-way calling terminal in this implementation, during use, it is not required that a human agent is arranged in advance, and the user may access the three-way calling terminal at any time through a communications terminal carried therewith. The human agent may select a suitable type of communications terminal according to actual requirements, which is not limited to a same communications terminal.

In addition, during the use of the three-way calling terminal in this implementation, a communication function is initiated by the communications terminal of the user. Therefore, it is not necessary to upload sensitive information, such as a telephone number of the client, to the telephone robot, thereby avoiding possible information leakage caused by the telephone robot during use.

In another implementation, the three-way calling terminal may be deployed directly in a communications terminal (an audio device) of the user, such as a mobile phone or a Bluetooth headset, where the audio devices include a speaker and a microphone, and the second speech interface in the three-way calling terminal is connected to the speaker and the microphone in the audio device. In this way, the audio device itself may have a function of supporting three-way calling. In this case, the user of the audio device can access the human agent through the audio device, transfer the speech data to the three-way calling terminal through the microphone, and receive the speech data transmitted by the three-way calling terminal through the speaker, to achieve entire movability of the three-way calling terminal. A deployment method of the three-way calling terminal in this implementation is illustrated below by an example.

In an example, a salesperson, as a user of the three-way calling terminal, can directly use an audio device (such as a mobile phone) deployed with a three-way calling terminal, thus saving a process of connecting the three-way calling terminal to a calling terminal of the user. In this way, deployment efficiency and conveniency of the three-way calling terminal may be effectively improved. On this basis, due to relatively strong movability of the audio device, places for using the three-way calling terminal are not restricted, and the three-way calling terminal in this implementation is significantly improved in flexibility of places for using as compared with that in the prior art.

In actual use, the salesperson in the foregoing example may turn on a three-way calling function on the mobile phone. Specifically, the salesperson may click three-way calling application software on the mobile phone to activate the three-way calling terminal, and turn on the three-way calling function. For example, after the three-way calling terminal is activated, the mobile phone enables the three-way calling terminal to be connected to the back-end processing module in the cloud through a networking function, and turns on a function of transferring speech data of the mobile phone interacting with another communications terminal to the three-way calling terminal. The salesperson makes a call to an intending client by the mobile phone, may receive speech data transmitted by the intending client through the mobile phone, and transfers the speech data to the three-way calling terminal, where the speech data is uploaded to the back-end processing module through the three-way calling terminal. After generating a corresponding response according to a rule, a telephone robot in the back-end processing module may transmit response data back to the three-way calling terminal, and the three-way calling terminal transmits the response data to the intending client through the mobile phone of the salesperson, so as to implement an interaction between the back-end processing module and the intending client. In the foregoing process, the salesperson can monitor an interaction process between the back-end processing module and the intending client at any time through the speaker of the audio device, and interact with the intending client through the three-way calling terminal when human intervention is required.

In another example, a salesperson serves as a user of the three-way calling terminal, where the three-way calling terminal is integrated in a Bluetooth headset. A three-way calling function may be achieved after the salesperson wears the headset. In actual use, when the salesperson wears the Bluetooth headset integrated with a three-way calling terminal, the three-way calling function may be turned on through a trigger button set on the Bluetooth headset or through an application installed on the mobile phone. After the three-way calling function is turned on, the salesperson makes a call to an intending client through the mobile phone. After receiving the speech data transmitted by the intending client, the mobile phone transfers the speech data to the Bluetooth headset through Bluetooth, and transfers the speech data to the three-way calling terminal, where the speech data is uploaded to the back-end processing module through the three-way calling terminal. After generating a corresponding response according to a rule, a telephone robot in the back-end processing module transmits response data back to the three-way calling terminal, and the three-way calling terminal transmits the response data to the intending client through the microphone in the Bluetooth headset, so as to implement an interaction between the back-end processing module and the intending client. In the foregoing process, the salesperson can monitor an interaction process between the back-end processing module and the intending client at any time through the speaker of the Bluetooth headset, and interact with the intending client through the three-way calling terminal when human intervention is required.

It may be learned from the foregoing uses that integration between the three-way calling terminal and the communications terminal in this implementation is higher, and the user may carry the three-way calling terminal everywhere and use the same in any scenario; this is not limited to a fixed use scenario.

The present disclosure provides a screen display function through the display module. Specifically, the three-way calling terminal displays session content of the call object and response content of the robot through the display module. When a display screen of the human agent is different from that of the three-way calling terminal, the session content and the response content are pushed to the human agent through the display module, to display the session content of the call object and the response content of the robot through the display screen of the human agent.

Specifically, in an implementation manner, the human agent and the call object simultaneously watch the display screen of the three-way calling terminal. At this time, the session content of the call object and the response content of the robot may be displayed directly through the display module (equivalent to the display screen) of the three-way calling terminal, so that the call object and the human agent simultaneously know the interaction process between a communication object and the phone robot, to facilitate interaction data synchronization between the human agent and the call object. In this way, the human agent may intervene in the call in time, to resolve a problem that cannot be resolved by the telephone robot.

In another implementation, the human agent may connect the three-way calling terminal through the communications terminal carried by the human agent (reference may be made to the first implementation of the deployment method of the three-way calling terminal above). At this time, if the communications terminal used by the human agent itself has a display screen, the human agent may browse the session content of the call object and the response content of the robot through the display screen. In this way, although the human agent uses the own communications terminal, an interaction process between the call object and the robot may also be learnt at any time. Furthermore, the back-end processing module may further process the session content of the call object and the response content of the robot, so that first content displayed on the three-way calling terminal and second content displayed on the display screen of the human agent are different. For example, if the human agent wants to learn detailed session content of the call object and response content of the robot, the back-end processing module processes the session content of the call object and the response content of the robot as the second content, and transmits the same to the human agent through the display module, to display the same on the display screen of the human agent. Meanwhile, if the call object wants to browse only the response content of the robot to quickly obtain required response information, the back-end processing module processes the response content of the robot as the first content, and displays the first content on the three-way calling terminal through the display module. This display manner has stronger pertinence, to meet different requirements of the call object and the human agent.

The present disclosure may be applied to implement a human-machine coordination calling telephone robot, and an operation process of the calling system is described as follows:

D1. Connecting a three-way calling terminal apparatus to a communications terminal device, where a connection manner may be Bluetooth or an audio interface of 3.5 mm;

D2. The human agent accesses the three-way calling terminal, where an access manner may be Bluetooth or an audio interface of 3.5 mm;

D3. The three-way calling terminal is connected to the back-end processing module, where a connection manner may be Ethernet, WIFI, 4G, or 5G;

D4. Controlling the communications terminal to make a call to the call object or answer a call of the call object;

D5. The session management submodule starts a session, transmits an instruction to the three-way calling terminal to enable the same to enter a call waiting mode, and meanwhile transmits necessary data, such as speech and text of a prologue and data relevant to the call object, to the three-way calling terminal;

D6. The three-way calling terminal detects a call connection signal, transmits prologue speech to the call object through the communications terminal, and displays relevant text information on the display screen;

D7. The three-way calling terminal receives the speech of the call object, and transmits the speech to the back-end processing module;

D8. The back-end processing module invokes the speech recognition submodule to convert the speech into text, recognizes an intention of the call object through the intention recognition submodule, and generates robot-replying text and speech after a session management module determines a decision, where optionally, the speech of the call object may also be recognized directly as the intention of the call object through the intention recognition submodule;

D9. The robot-replying text and speech is transmitted to the three-way calling terminal; through the networking submodule;

D10. The robot-replying text and speech is played after being processed by the data processing submodule in the three-way calling terminal, and meanwhile is transmitted to the call object through the communications terminal;

D12. After being processed by the data processing submodule in the three-way calling terminal, the replying text is displayed on the display screen in a form of a call record;

D13. The human agent may receive the robot speech and the speech of the call object through the second speech interface, or learn a session procedure by watching text on the screen;

D14. When the human agent considers it necessary, pressing an intervention button set on the three-way calling terminal to start human intervention;

D15. The data processing submodule in the three-way calling terminal transfers the session into a human intervention mode (having no impact on the communications system), and cuts off the connection to the back-end processing module;

D16. The human agent directly speaks to the second speech interface in the three-way calling terminal, transmits speech to the call object through the communications terminal, and directly talks with the call object, to achieve seamless switching, where the robot speech and the speech of the human agent have been matched through the speech synthesis submodule, and therefore, the speech of the agent may be better simulated;

D17. The dialogue between the human agent and the call object may also be recognized as text through the speech recognition submodule of the back-end processing module, and is displayed on the display screen; and D18. Saving related data such as the call record to the database when the session is ended.

The foregoing descriptions relate to merely preferred embodiments of the present invention, and the protection scope of the present invention is not limited to the foregoing examples. All technical solutions belonging to the concept of the present invention fall within the protection scope of the present invention. It should be pointed out that persons of ordinary skills in the art would understand, several improvements and modifications made without departing from the principle of the present invention should also be considered to fall within the protection scope of the present invention.

What is claimed is:

1. A three-way calling terminal for a mobile human-machine coordination calling robot, comprising:
   a first speech interface, configured to transfer call audio between a call object and a back-end processing module, the call object representing a user for establishing call connection to the three-way calling terminal by using a user terminal;
   a CODEC1 module, configured to encode and/or decode the call audio between the call object and the back-end processing module;
   a second speech interface, configured to transfer call audio between a human agent and the call object;
   a CODEC2 module, configured to encode and/or decode the call audio between the human agent and the call object;
   a call control module, configured to process a control signal, and automatically make, answer, and hang up a call;
   a data processing submodule, configured to process speech data and perform data transfer between the data processing submodule and the back-end processing module; and
   a networking submodule, configured to perform network connection to the back-end processing module.

2. The three-way calling terminal for a mobile human-machine coordination calling robot according to claim 1, wherein the three-way calling terminal further comprises a display module configured to display a call record or call-related information between the three-way calling terminal and the call object.

3. The three-way calling terminal for a mobile human-machine coordination calling robot according to claim 1, wherein the three-way calling terminal further comprises a keypad submodule, through which a control instruction is inputted.

4. The three-way calling terminal for a mobile human-machine coordination calling robot according to claim 3, wherein the back-end processing module is configured to process speech data transmitted by the three-way calling terminal, and generate response speech and text to be transmitted back to the three-way calling terminal.

5. The three-way calling terminal for a mobile human-machine coordination calling robot according to claim 1, wherein the back-end processing module comprises a dialogue management submodule, a speech recognition submodule, an intention recognition submodule, and a speech synthesis submodule;
   the dialogue management submodule is configured to control procedure and logic of a dialogue, and generate response text;
   the speech recognition submodule is configured to recognize and convert received speech of the call object into text;
   the intention recognition submodule is configured to recognize an intention of the call object based on the text of the recognized speech; and
   the speech synthesis submodule is configured to synthesize and transmit speech from the response text to the three-way calling terminal.

* * * * *